United States Patent [19]
Dimroth et al.

[11] 3,941,766
[45] Mar. 2, 1976

[54] AZO COMPOUNDS FROM PIGMENTS OF A HETEROCYCLIC-SUBSTITUTED ANILINE COUPLED TO A 2,6-DIHYDROXY-4-METHYL-3-CYANO OR -3-CARBAMOYLPYRIDINE

[75] Inventors: Peter Dimroth, Ludwigshafen; Walter Dammert, Frankenthal, both of Germany

[73] Assignee: Badische Anilin- & Soda-Fabrik Aktiengesellschaft, Ludwigshafen (Rhine), Germany

[22] Filed: Jan. 7, 1974

[21] Appl. No.: 431,579

[30] Foreign Application Priority Data
Jan. 10, 1973 Germany............................ 2300940

[52] U.S. Cl. ................. 260/155; 260/154; 260/156
[51] Int. Cl.² .......................................... C09B 29/36
[58] Field of Search..................... 260/154, 155, 156

[56] References Cited
UNITED STATES PATENTS
3,725,383  4/1973  Austin et al. .................. 260/156 X FOREIGN PATENTS OR APPLICATIONS
1,901,711  4/1970  Germany ............................ 260/156
2,004,487  8/1971  Germany ............................ 260/156

Primary Examiner—Charles F. Warren
Attorney, Agent, or Firm—Johnson, Keil, Thompson & Shurtleff

[57] ABSTRACT

Azo pigments having 2,6-dihydroxy-4-methyl-3-cyanopyridine or 2,6-dihydroxy-4-methyl-3-carbamolpyridine as coupling component and a heterocyclic substituted aniline as diazo component. The pigments have the formula

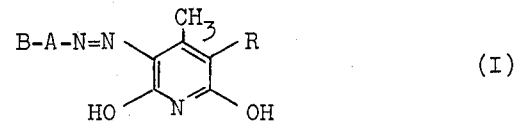

(I)

in which
R is cyano or carbamoyl;
A is an unsubstituted or substituted benzene ring; and
B is a heterocyclic ring which is fused with the benzene ring and which contains at least one —NH— and —CO— or at least one —NH—CO— group. Compounds of this formula as pigments are eminently suitable for coloring printing inks, surface coatings and resins.

4 Claims, No Drawings

AZO COMPOUNDS FROM PIGMENTS OF A HETEROCYCLIC-SUBSTITUTED ANILINE COUPLED TO A 2,6-DIHYDROXY-4-METHYL-3-CYANO OR -3-CARBAMOYLPYRIDINE

The invention relates particularly to azo pigments of the formula (II):

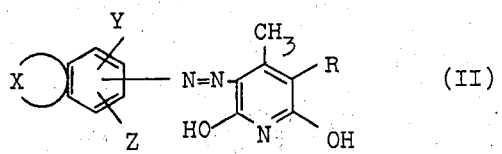

in which

R is cyano or carbamoyl;
X is the completion of a five-membered or six-membered ring which contains the grouping 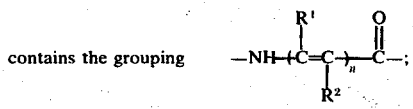

n is zero or 1;
$R^1$ is hydrogen or methyl;
$R^2$ is hydrogen;
$R^1$ and $R^2$ together with the carbon atoms joining them may be an unsubstituted or substituted benzene or naphthalene ring;
Y is hydrogen, chloro, bromo, methyl, methoxy or ethoxy; and
Z is hydrogen or chloro.

Examples of radicals X are:

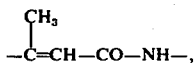

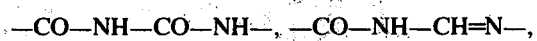

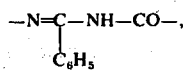

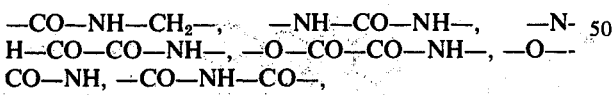

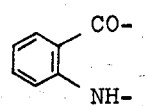

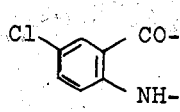

or —CO—NH—SO$_2$—NH—.

The rings formed by $R^1$ and $R^2$ together with the carbon atoms which link them together may bear for example chlorine, bromine, methyl, methoxy, ethoxy, sulfamoyl, N-substituted sulfamoyl or carbamoyl as substituents.

Compounds of the formula (IIa):

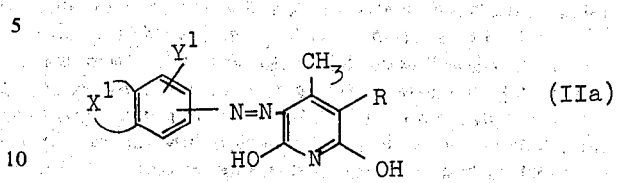

in which

R is cyano or carbamoyl;
$Y^1$ is hydrogen, chloro or methyl; and
$X^1$ completes a five-membered or six-membered ring and contains the grouping —NHCO— are particularly valuable industrially.

Compounds of formula (I) are excellent pigments which are particularly suitable for the production of printing inks, for coloring plastics such as polystyrene, polyvinyl chloride or polyurethanes or for coloring surface coatings, for example melamine, acrylate or polyester coatings. Many of the new compounds are distinguished by hiding power comparable with that of inorganic pigments.

Compounds of formula (I) may be prepared by a conventional method by diazotization of an amine of the formula:

in which A and B have the above meanings followed by coupling with 2,6-dihydroxy-4-methyl-3-cyanopyridine or 2,6-dihydroxy-4-methyl-3-carbamoylpyridine.

The pigments prepared in this way are not always obtained in the optimum physical form for all applications; they may be converted however by conventional methods such as grinding, swelling or recyrstallization into a particularly suitable form for the special application.

The following Examples illustrate the invention. Parts and percentages refer to weight unless otherwise specified.

EXAMPLE 1

174 parts of the amine of the formula:

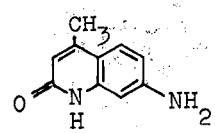

is stirred into 350 parts by volume of concentrated hydrochloric acid for half an hour and there are then added 1000 parts of ice and 1000 parts of water after which 320 parts of 23% sodium nitrite solution is gradually added. The whole is stirred for another three hours at 0° to 5°C, then the excess of nitrite is destroyed by adding sulfamic acid and the solution is filtered. 150 parts of 2,6-dihydroxy-3-cyano-4-methylpyridine is then added to the solution and 180 parts of sodium acetate in 1000 parts of water is gradually added. The whole is stirred for six hours and then suction filtered and the filter cake is washed with water and while moist introduced into 800 parts of glacial acetic acid and heated for three hours under reflux, the water being allowed to distill off. The whole is suction filtered, washed thoroughly with water and dried. 294 parts of a bright orange pigment is obtained which when incorporated in the usual way in a strength of 1% into flexible PVC without titanium dioxide gives a PVC material having very good hiding power, good fastness to migration and good fastness to light. In a melamine resin surface coating an excellent bright orange color is obtained in a conventional way which has satisfactory overcoating fastness and good hiding power.

Pigments having the hue specified in the following Table are obtained by the method of Example 1 with the amines and coupling components specified in the Table:

| Example | B—A—NH$_2$ | R | Color |
|---|---|---|---|
| 2 | 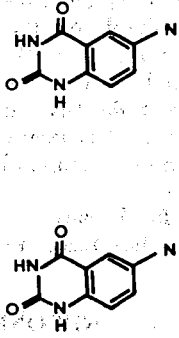 | —CN | reddish brown |
| 3 | 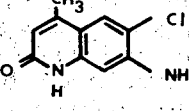 | —CONH$_2$ | orange |
| 4 | 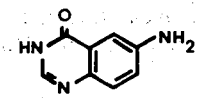 | —CN | red |
| 5 | 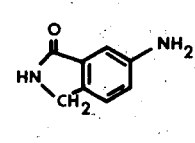 | —CN | reddish brown |
| 6 | 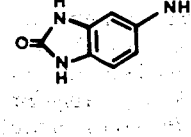 | —CN | yellow |
| 7 | '' | —CONH$_2$ | yellow |
| 8 | 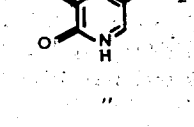 | —CONH$_2$ | reddish orange |
| 9 | 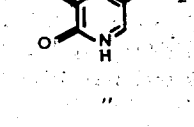 | —CN | red |
| 10 | '' | —CONH$_2$ | orange |
| 11 | 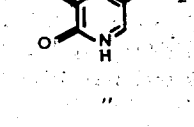 | —CN | reddish brown |
| 12 | 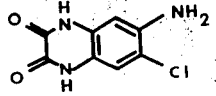 | —CN | red |
| 13 | '' | —CONH$_2$ | orange |
| 14 | 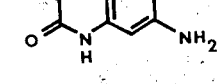 | —CN | orange |
| 15 | 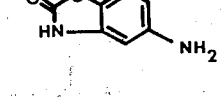 | —CN | orange |
| 16 | 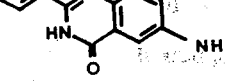 | —CN | yellow |
| 17 | 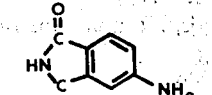 | —CN | orange |
| 18 | '' | —CONH$_2$ | yellow |
| 19 | 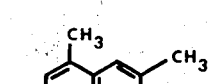 | —CN | reddish brown |
| 20 | 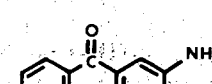 | —CN | orange |
| 21 | 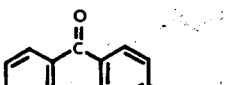 | —CN | red |

| Example | B—A—NH₂ | R | Color |
|---|---|---|---|
| 22 | 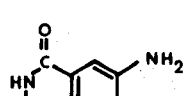 | —CN | orange |
| 23 | 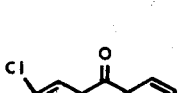 | —CN | orange |

We claim:
1. An azo pigment having the formula

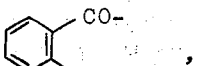

in which
R is cyano or carbamoyl,
X is

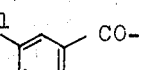

—CO—NH—CO—NH—, —CO—NH—CH=N—,

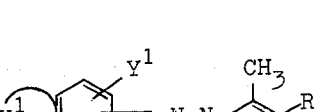

—CO—NH—CH₂—, —NH—CO—NH—, —NH—CO—CO—NH—, —O—CO—CO—NH—, —O—CO—NH—, —CO—NH—CO—,

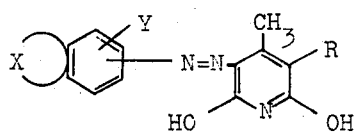

or —CO—NH—SO₂—NH—, and
Y is hydrogen, chlorine, bromine, methyl, methoxy or ethoxy.

2. An azo pigment according to claim 1 having the formula

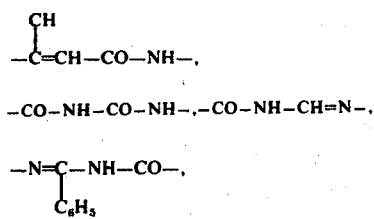

in which
R is cyano or carbamoyl,
X¹ is

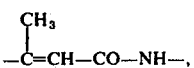

—CO—NHCONH—, —NHCONH—, NHCO—CONH— or —CONHCO—, and
Y¹ is hydrogen or chlorine.

3. An azo pigment according to the formula in claim 1 in which R is cyano.

4. The azo pigment having the formula

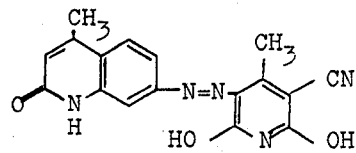

* * * * *